(12) United States Patent
Park et al.

(10) Patent No.: US 8,387,478 B2
(45) Date of Patent: Mar. 5, 2013

(54) ELECTRONIC SHIFTING APPARATUS FOR VEHICLE

(75) Inventors: Hangil Park, Hwaseong-si (KR); Namsik Baek, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 420 days.

(21) Appl. No.: 12/885,188

(22) Filed: Sep. 17, 2010

(65) Prior Publication Data

US 2011/0132122 A1  Jun. 9, 2011

(30) Foreign Application Priority Data

Dec. 4, 2009  (KR) .................. 10-2009-0119735

(51) Int. Cl.
*F16H 59/00* (2006.01)
(52) U.S. Cl. ...................... 74/335; 74/473.21
(58) Field of Classification Search .............. 74/335, 74/473.12, 473.21
See application file for complete search history.

(56) References Cited

U.S. PATENT DOCUMENTS

| | | | | |
|---|---|---|---|---|
| 4,663,713 A | * | 5/1987 | Cornell et al. | 701/52 |
| 4,960,008 A | * | 10/1990 | Yen et al. | 74/473.18 |
| 4,987,792 A | * | 1/1991 | Mueller et al. | 74/473.12 |
| 5,056,376 A | | 10/1991 | Moroto et al. | |
| 5,810,448 A | * | 9/1998 | Kingsley et al. | 299/39.3 |
| 5,916,292 A | * | 6/1999 | Issa et al. | 701/62 |
| 2002/0166400 A1 | | 11/2002 | Syamoto et al. | |

FOREIGN PATENT DOCUMENTS

| | | |
|---|---|---|
| JP | 3-153958 A | 7/1991 |
| JP | 6-1157 A | 1/1994 |
| JP | 2001-304395 A | 10/2001 |
| JP | 2002-274210 A | 9/2002 |
| JP | 2003-162337 A | 6/2003 |
| WO | WO 2007/009415 A1 | 1/2007 |

* cited by examiner

*Primary Examiner* — Ha D. Ho
(74) *Attorney, Agent, or Firm* — Morgan, Lewis & Bockius LLP

(57) ABSTRACT

An electronic shifting apparatus for a vehicle may include an operator movable along at least two or more straight paths, a shift lock assembly controlling a movement of the operator, a sensor detecting changes in position of the operator, a P-switch for selecting a P-range, a safety switch receiving an input from a driver, a controller outputting a shifting signal for controlling a transmission, wherein one of the straight paths sequentially have an R-temporary point for selecting a R-range, an NR-fixing point and an ND-fixing point for selecting an N-range, and a D-temporary point for selecting a D-range, wherein the ND-fixing point is connected with another straight path connecting an M-fixing point for selecting a neutral state in an manual mode, and both sides of the M-fixing point are connected with a (+)-temporary point (+) and a (−)-temporary point (−) through another straight line to operate the manual mode.

22 Claims, 14 Drawing Sheets

FIG.9

| Lever Position | Shift Lock | | |
|---|---|---|---|
| R | 1. Gear = M | | |
| Nr | 2. Gear = P && CONDITION Off | 4. Gear = N && CONDITION Off | 6. Gear = R |
| | 3. Gear = P && CONDITION On | 5. Gear = N && CONDITION On | |

FIG.10

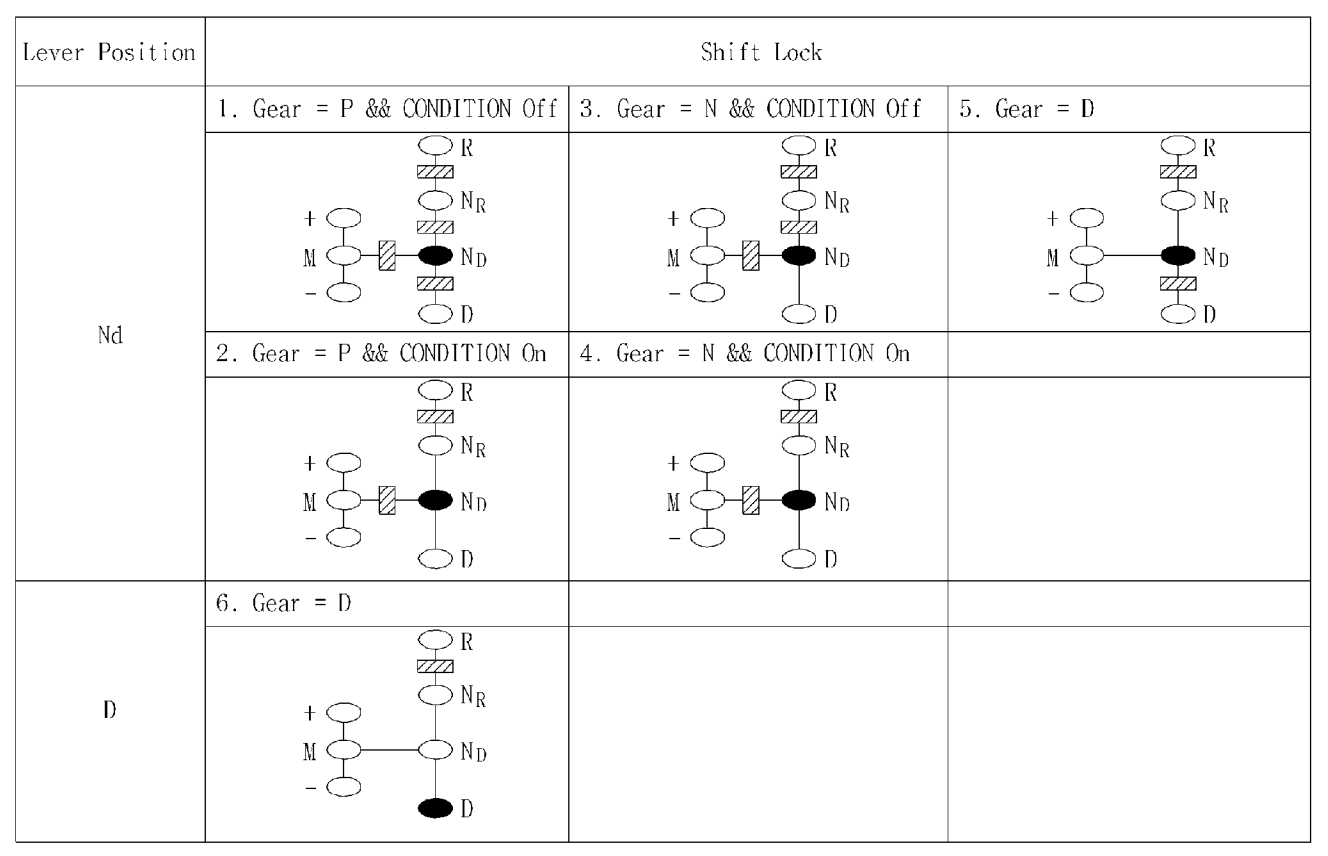

| Lever Position | Shift Lock | | | | |
|---|---|---|---|---|---|
| Nd | 1. Gear = P && CONDITION Off | 2. Gear = P && CONDITION On | 3. Gear = N && CONDITION Off | 4. Gear = N && CONDITION On | 5. Gear = D |
| D | 6. Gear = D | | | | |

FIG.12

| NO. | POSITION | USER'S SHIFTING INTENTION | PATH ON SHIFT PATTERN ||||  CHANGE IN TRANSMISSION |
| | | | INITIAL RANGE | CONDITION SATISFIED | OPERATIONAL PATH | FINAL RANGE | |
|---|---|---|---|---|---|---|---|
| 1 | Nr | P → R | Nr[P] | Nr | R | Nr[R] | P → R |
| 2 | Nr | P → D | Nr[P] | Nr | | Nd[D] | P → D |
| 3 | Nr | R → R | Nr[R] | | | Nr[R] | X |
| 4 | Nr | R → N | Nr[R] | | Nd[N] | Nd[D] | R → N |
| 5 | Nr | R → D | Nr[R] | | D | Nd[D] | R → D |
| 6 | Nr | R → P | Nr[R] | Nr | R | Nr[P] | R → P |
| 7 | Nr | N → R | Nr[N] | | | Nr[R] | N → R |
| 8 | Nr | N → D | Nr[N] | | | Nd[D] | N → D |
| 9 | Nr | N → P | Nr[N] | | | Nr[P] | N → P |

FIG.13

| NO. | POSITION | USER'S SHIFTING INTENTION | PATH ON SHIFT PATTERN | | | | CHANGE IN TRANSMISSION |
|---|---|---|---|---|---|---|---|
| | | | INITIAL RANGE | CONDITION SATISFIED | OPERATIONAL PATH | FINAL RANGE | |
| 10 | Nd | P → R | Nd[P] | Nd | | Nr[R] | P → R |
| 11 | Nd | P → D | Nd[P] | Nd | D | Nd[D] | P → D |
| 12 | Nd | N → R | Nd[N] | Nd | | Nr[R] | N → R |
| 13 | Nd | N → D | Nd[N] | | D | Nd[D] | N → D |
| 14 | Nd | N → P | Nd[N] | | | Nd[P] | N → P |
| 15 | Nd | D → N | Nd[D] | Nd | Nr | Nr[N] | D → N |
| 16 | Nd | D → R | Nd[D] | | R | Nr[R] | D → R |
| 17 | Nd | D → P | Nd[D] | | | Nd[P] | D → P |
| 18 | Nd | D → D | Nd[D] | | | Nd[D] | X |

FIG.14

| NO. | POSITION | USER'S SHIFTING INTENTION | PATH ON SHIFT PATTERN | | | CHANGE IN TRANSMISSION |
|-----|----------|---------------------------|-----------------------|---|---|------------------------|
| | | | INITIAL RANGE | CONDITION SATISFIED | OPERATIONAL PATH | FINAL RANGE | |
| 19 | Nd | D → M | Nd[D] | | | M | D → M |
| 20 | M | M → D | M | | | Nd[D] | M → D |
| 21 | M | M → +/- | M | | | +/- | M → +/- |

ELECTRONIC SHIFTING APPARATUS FOR VEHICLE

CROSS-REFERENCE TO RELATED APPLICATIONS

The present application claims priority to Korean Patent Application Number 10-2009-0119735, filed Dec. 4, 2009, the entire contents of which application is incorporated herein for all purposes by this reference.

BACKGROUND OF THE INVENTION

1. Field of the Invention

The present invention relates to an electronic shifting apparatus for a vehicle, in more detail, a shift lock device of an electronic shifting apparatus that operates a transmission in a shift-by-wire way.

2. Description of Related Art

Shift-by-wire shifting apparatuses control a transmission in response to an electric signal generated when a driver shifts, without mechanically transmitting a shifting force from the driver to the transmission through a cable as in the related art.

In order to achieve the shift-by-wire shifting apparatus it is required to appropriately convert the shifting force from the driver into an electric signal and receive the signal. Further, it is required to automatically prohibit dangerous or unlawful shifting, allowing a driver to operate the apparatus in a way similar to mechanical shifting apparatuses with a lever in the related art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an electronic shifting apparatus for a vehicle that provides usability similar to the mechanical shift lever apparatuses known in the art and convenience in use, and makes it possible to safe and convenient shift by preventing unlawful shifting or shifting which may cause dangerous circumstances.

An aspect of the present invention provides an electronic shifting apparatus for a vehicle that may include an operator movable along at least two or more straight paths crossing each other at at least a point, a shift lock assembly controlling a movement of the operator on the straight paths of the operator, a sensor detecting changes in position of the operator moving along the straight paths, a P-switch for selecting a P-range, a safety switch receiving an input from a driver, other than for moving the operator, a controller outputting a shifting signal for controlling a transmission in response to an input from the sensor, the P-switch, and the safety switch and controlling the shift lock assembly on the basis of the position of the operator, wherein one of the straight paths sequentially have an R-temporary point for selecting a R-range, an NR-fixing point and an ND-fixing point for selecting an N-range, and a D-temporary point for selecting a D-range, wherein the ND-fixing point may be connected with another straight path connecting an M-fixing point for selecting a neutral state in an manual mode, and both sides of the M-fixing point are connected with a (+)-temporary point (+) and a (−)-temporary point (−) through another straight line to operate the manual mode.

According to the present invention, it is possible to provide usability similar to the mechanical shift lever apparatuses known in the art and convenience in use, and implement safe and convenient shifting by preventing unlawful shifting or shifting which may cause dangerous circumstances.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIGS. 9 to 11 are views illustrating shift lock states corresponding to each state of the shifting apparatus of the present invention.

FIGS. 12 to 14 are views illustrating changes in shift-locking state corresponding to the operations of the shifting apparatus of the present invention.

Figure 1:
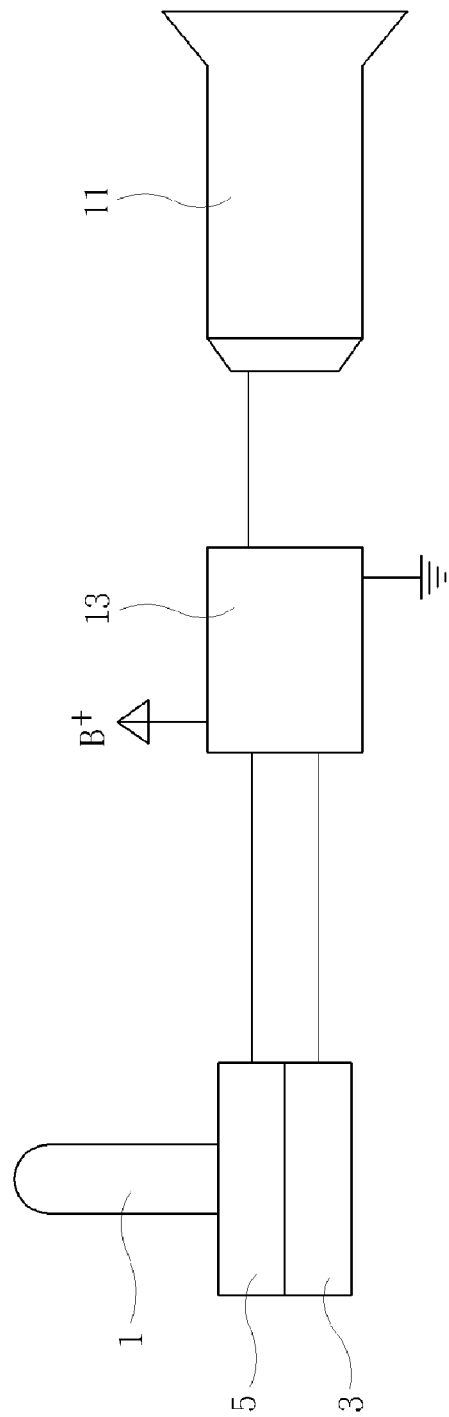
FIG. 1 is a view illustrating the configuration of an electronic shifting apparatus of a vehicle according to the present invention.
Figure 2:
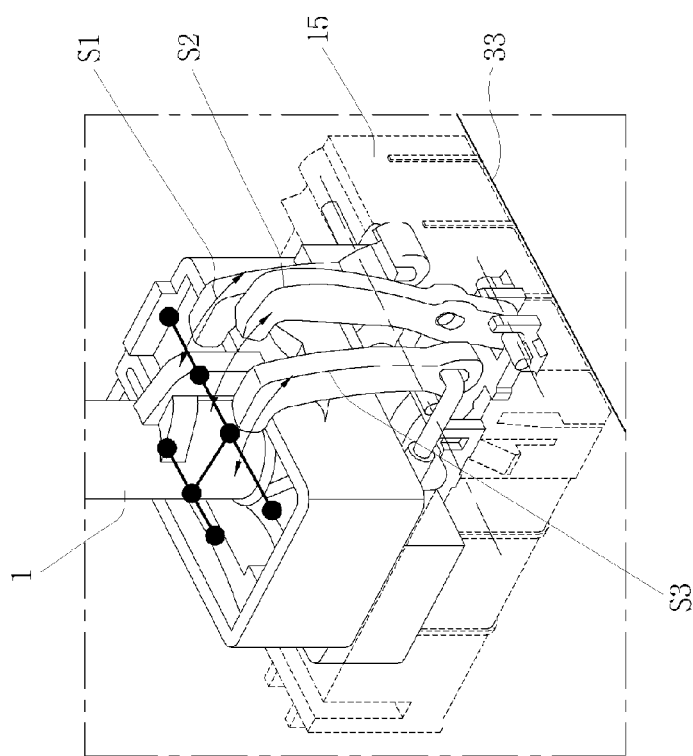
FIG. 2 is a view showing an embodiment of a shift lock assembly of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 7, an embodiment of the present invention includes, an operator 1 movable along at least two or more straight paths L crossing each other at one point, a shift lock assembly 3 controlling the movement on straight paths L of operator 1, a sensor 5 detecting changes in position of operator 1 moving along straight paths L, a P-switch 7 for selecting the P-range, a safety switch 9 receiving an input from a driver, other than for moving operator 1, a controller 13 outputting a shifting signal for controlling a transmission 11 in response to an input from sensor 5, P-switch 7, and safety switch 9 and controlling shift lock assembly 3 on the basis of the position of operator 1.

Figure 3:
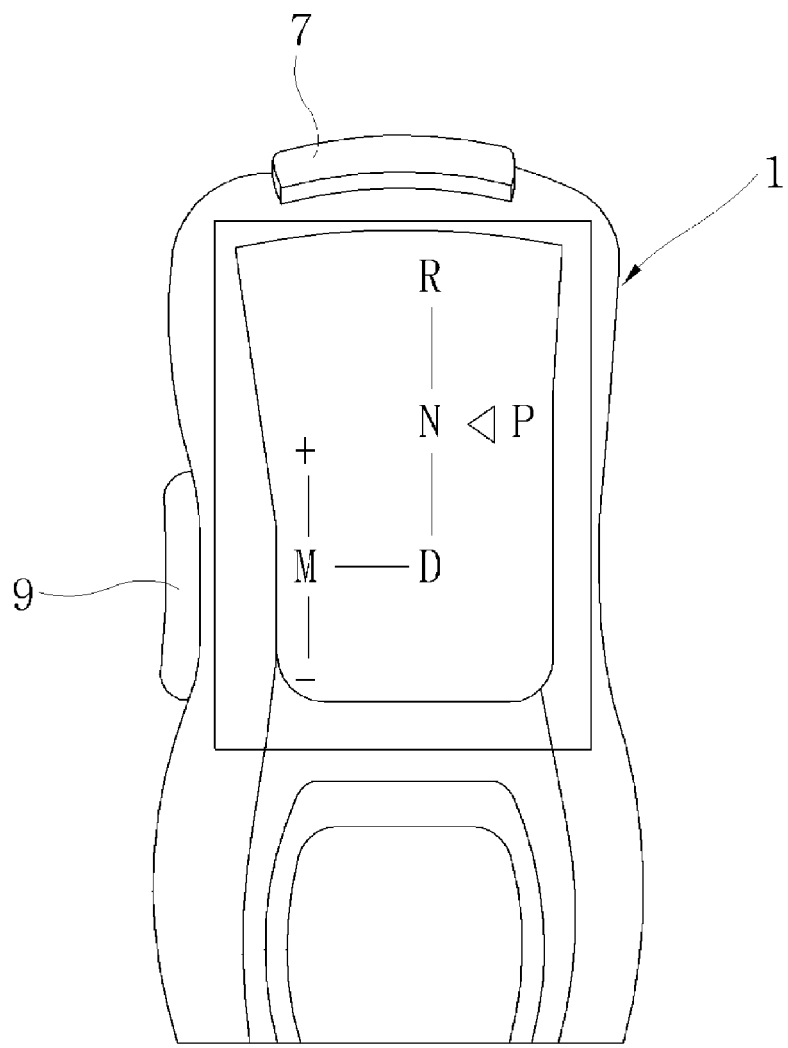
FIG. 3 is a view showing an embodiment of an operator of the present invention.

In this configuration, operator 1, as shown in FIG. 3, is formed in a shape similar to shift levers of the related art and configured such that as it rotates about a pivot point at the lower portion (not shown), a predetermined point spaced upward from the pivot point moves along straight paths L, constructing a path close to a straight line.

It should be understood that operator 1 may be a slider, not a lever, which substantially moves along straight paths L.

One of straight paths L sequentially have an R-temporary point R for selecting the R-range, an NR-fixing point Nr and an ND-fixing point Nd for selecting the N-range, and a D-temporary point D for selecting the D-range, ND-fixing point Nd is connected with another straight path L connecting an M-fixing point M for selecting the neutral state in the manual mode, and both sides of M-fixing point M are connected with a (+)-temporary point (+) and a (−)-temporary point (−) through another straight line L to operate the manual mode The fixing point implies a position where operator 1 can keep the position without an external force and the temporary point implies a position where operator 1 automatically returns to an adjacent fixing point when an external force applied to operator 1 is removed.

Figure 4:
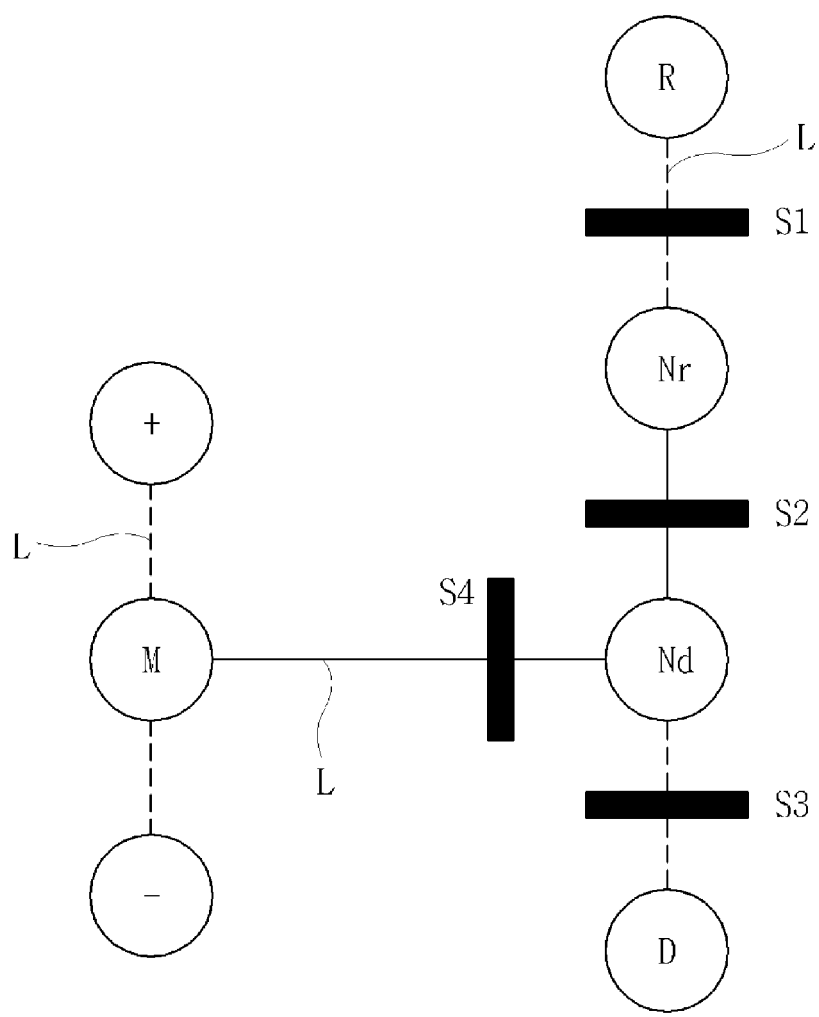
FIG. 4 is a view a shifting pattern of the operator of the present invention.

The path that operator 1 can move on is shown in FIG. 4, operator 1 can keep the position at NR-fixing point Nr, ND-fixing position Nd, and M-fixing position unless an external force is applied. However, when operator 1 is at R-temporary position R, D-temporary position D, (+)-temporary position (+), and (−)-temporary position (−) and an external force is removed, it automatically moves from the temporary positions to the closest fixing position therefrom.

For reference, the solid line in FIG. 4 represents the intervals between the fixing points and the dotted line represents the intervals between the temporary points and the fixing points.

Figure 5:
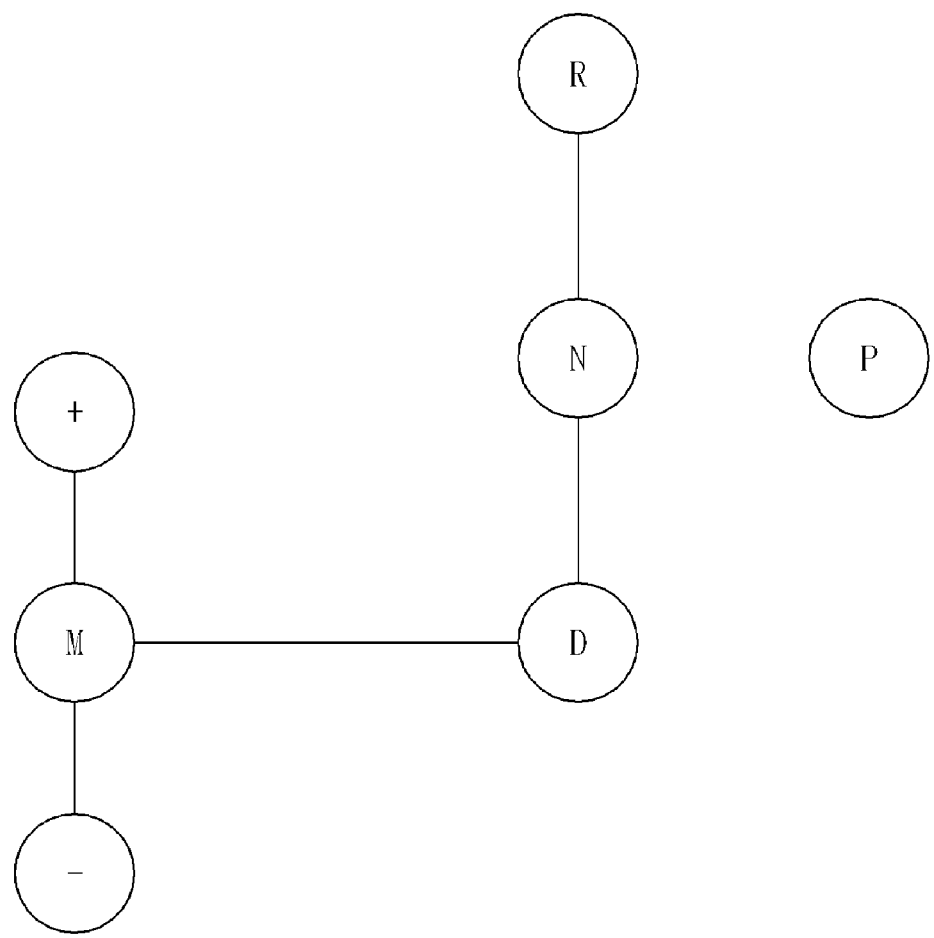
FIG. 5 is a view showing a virtual shifting pattern recognized by a driver, when the operator moves in the shifting pattern shown in FIG. 4.
Figure 6:
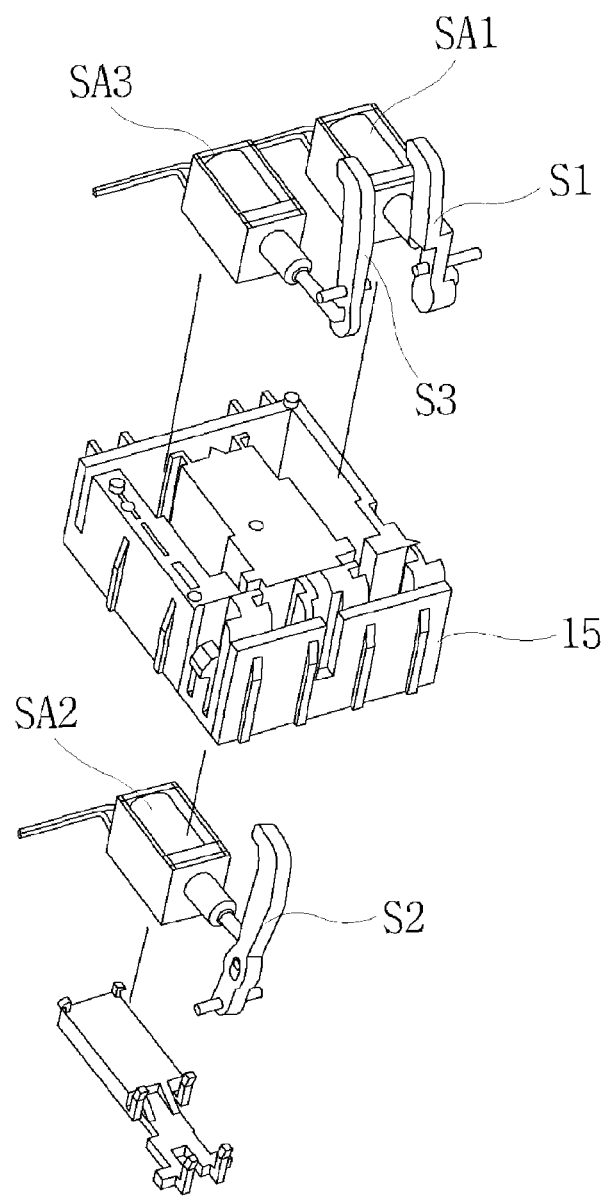
FIG. 6 is an exploded perspective view of the shift lock assembly shown in FIG. 2.
Figure 7:
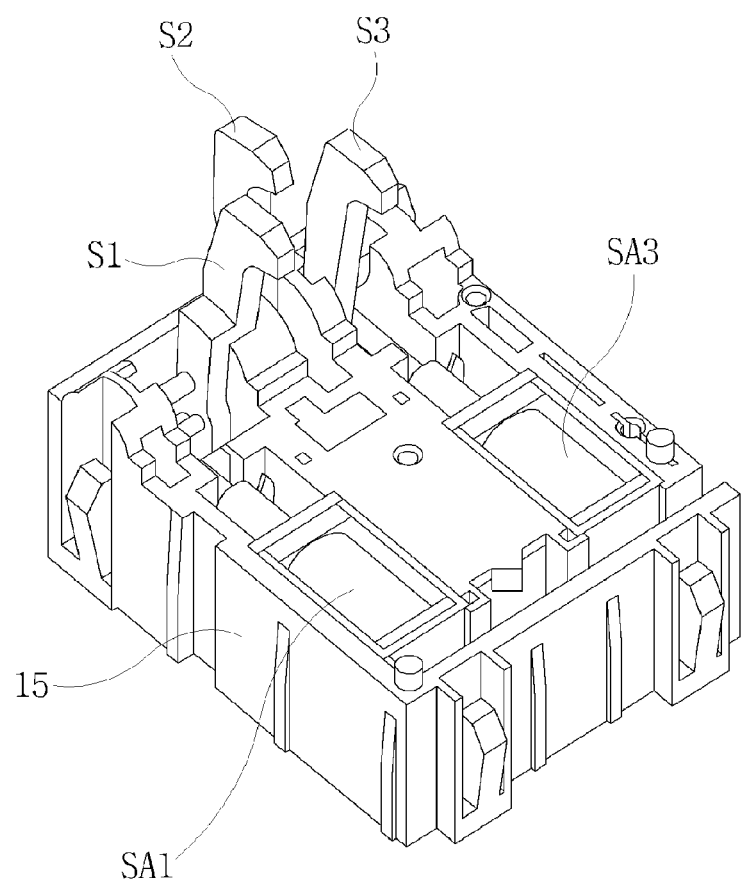
FIG. 7 is an assembly view of FIG. 6.

Although operator 1 moves substantially along the path shown in FIG. 4 in the electronic shifting apparatus of the present invention, the driver feels as if it is controlled to operate in the similar operational pattern of mechanical shift lever devices of the related art, as shown in FIG. 5. This control is implemented by shift lock assembly 3 and it is possible to satisfy legal restrictions and prevent dangerous shifting.

In the present embodiment, shift lock assembly 3 includes, a locking body 15 fixed to the car body 33, a first lock lever S1, a second rocking lever S2, a third lock lever S3, and a fourth lock lever S4 rotatably connected to locking body 15 to selectively restrict movement of operator 1 between R-temporary point R and NR-fixing point Nr, between NR-fixing point Nr and ND-fixing point Nd, between ND-fixing point Nd and D-temporary point D, and between ND-fixing point Nd and M-fixing point M, respectively, and a first actuator SA1, a second actuator SA2, a third actuator SA3, and a fourth actuator SA4 controlled by controller 13 to rotate first lock lever S1, second lock lever S2, third lock lever S3, and fourth lock lever, respectively.

First to fourth actuators may be solenoid actuators or may be implemented by other types of actuators, such as a motor or an electromagnet.

First lock lever S1 to third lock lever S3 has a restricting portion 17 that restricts movement of operator 1 and the opposite portion to restricting portion 17 of first lock lever S1 to third lock lever S3 are pivotably connected to lock body 15 by a hinge H. In the present embodiment, first actuator SA1 to third actuator SA3 each have an operating rod 19 connected to first lock lever S1 to third lock lever S3 to transmit straight motion to first lock lever S1 to third lock lever S3 such that they pivot on hinge H.

In this configuration, the positional order of restricting portion 17, operating rod 19 connected thereto, and hinge H in second lock lever S2 is different from the positional order of restricting portions 17, operating rod 19 connected thereto, and hinge H in first lock lever S1 and third lock lever S3.

That is, hinge H is positioned between restricting portion 17 and operating rod 19 connected thereto in first lock lever S1, operating rod 19 is positioned between restricting portion 17 and hinge H in second lock lever S2, and hinge H is positioned between restricting portion 17 and operating rod 19 connected thereto in third lock lever S3.

First actuator SA1 to third actuator SA3 move straight operating rod 19 when being supplied with control current, and elastically return operating rod 19 when the control current is stopped. First lock lever S1 and third lock lever S3 are disposed such that restricting portions 17 restrict movement of operator 1, when the control current is stopped to first actuator SA1 and third actuator SA3, and second lock lever S2 is disposed such that restricting portion 17 restricts movement of operator 1, when control current is supplied to second actuator SA2.

Figure 8:
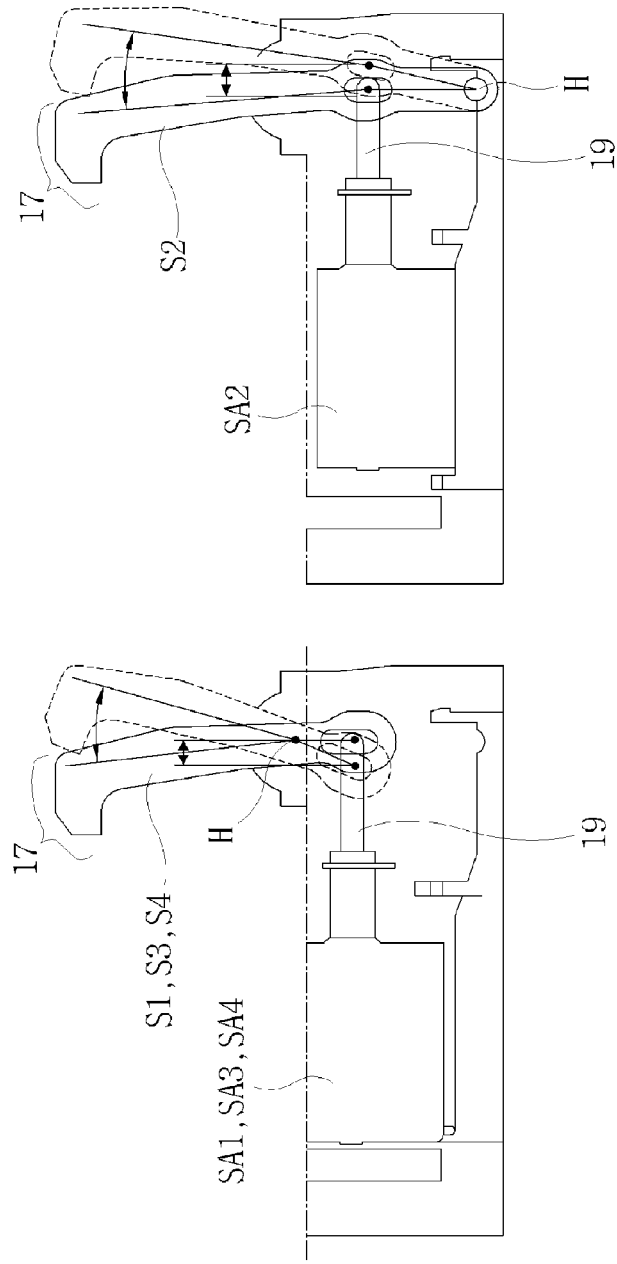
FIG. 8 a view comparing operational methods of an actuator and lock levers.

Therefore, as shown in comparative examples of FIG. 8, first actuator SA1 and third actuator SA3 are in a shift lock state in which first lock lever S1 and third lock lever S3 restrict movement of operator 1, when control current is not supplied, and are in a shift release state in which first lock lever S1 and third lock lever S3 allow operator 1 to move, when control current is supplied.

Further, second actuator SA2 is in a shift release state in which second lock lever S2 allows operator 1 to move, when control current is not supplied, and is in a shift lock state in which second lock lever S2 restricts movement of operator 1, when control current is supplied.

Figure 11:
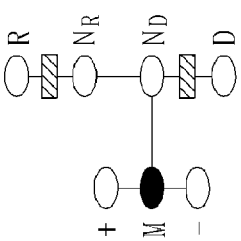

The reason that the operational mechanisms of second actuator SA2 and second lock lever S2 are configured differently is that second lock lever S2 is the least in the shift lock state in the shift lock states implemented by the shifting apparatus, as shown in FIGS. 9 to 11. Accordingly, this configuration relatively reduces time to supply control current to the actuators, such that it is possible to reduce the driving current consumed and it is not required to a specific measure for removing heat generated from the actuators.

For reference, it is possible to implement the mechanism between fourth actuator SA4 and fourth lock lever S4 the same as the mechanism between first actuator SA1 and first lock lever S1, and this is also shown in FIG. 8.

Each shift lock state implemented by controller 13 in the shifting apparatus is described hereafter with reference to FIGS. 9 to 11.

Controller 13, as shown in 1 of FIG. 9, controls first actuator SA1 to fourth actuator SA4 while making only third lock lever S3 and fourth lock lever S4 restrict movement of operator 1, in response to a signal from sensor 5 which represents that operator 1 have reached R-temporary point R.

Further, as shown in 2 of FIG. 9, when receiving a signal from sensor 5 which represents that operator 1 has reached NR-fixing point Nr and determining that the shift lever is at the P-range and predetermined conditions are not satisfied, controller 13 controls first actuator SA1 to fourth actuator SA4 such that all of first lock lever S1 to fourth lock lever S4 restricts movement of operator 1.

As shown in 3 of FIG. 9, when receiving a signal from sensor 5 which represents that operator 1 has reached NR-fixing point Nr and determining that the shift lever is at the P-range and the predetermined conditions are satisfied, controller 13 controls first actuator SA1 to fourth actuator SA4 such that only third lock lever S3 and fourth lock lever S4 restrict movement of operator 1.

As shown in 4 of FIG. 9, when receiving a signal from sensor 5 which represents that operator 1 has reached NR-fixing point Nr and determining that the shift lever is at the N-range and the predetermined conditions are not satisfied, controller 13 controls first actuator SA1 to fourth actuator SA4 such that only first lock lever S1 and third lock lever S3 restrict movement of operator 1.

As shown in 5 of FIG. 9, when receiving a signal from sensor 5 which represents that operator 1 has reached NR-fixing point Nr and determining that the shift lever is at the N-range and the predetermined conditions are satisfied, controller 13 controls first actuator SA1 to fourth actuator SA4 such that only third lock lever S3 restricts movement of operator 1.

As shown in 6 of FIG. 9, when receiving a signal from sensor 5 which represents that operator 1 has reached NR-fixing point Nr and determining that the shift lever is at the R-range, controller 13 controls first actuator SA1 to fourth actuator SA4 such that only first lock lever S1 and fourth lock lever S4 restrict movement of operator 1.

Referring to FIG. 10, when receiving a signal from sensor 5 which represents that operator 1 has reached ND-fixing point Nd, as shown in 1 of FIG. 10, determining that the shift lever is at the P-range and the predetermined conditions are not satisfied, controller 13 controls first actuator SA1 to fourth actuator SA4 such that all of first lock lever S1 to fourth lock lever S4 restricts movement of operator 1.

Further, as shown in 2 of FIG. 10, when receiving a signal from sensor 5 which represent that operator 1 has reached ND-fixing point Nd and determining that the shift lever is at the P-range and the predetermined conditions are satisfied, controller 13 controls first actuator SA1 to fourth actuator SA4 such that only first lock lever S1 and fourth lock lever S4 restrict movement of operator 1.

As shown in 3 of FIG. 10, when receiving a signal from sensor 5 which represent that operator 1 has reached ND-fixing point Nd and determining that the shift lever is at the N-range and the predetermined conditions are not satisfied, controller 13 controls first actuator SA1 to fourth actuator SA4 such that only first lock lever S1, second lock lever S2, and fourth lock lever S4 restrict movement of operator 1.

As shown in 4 of FIG. 10, when receiving a signal from sensor 5 which represent that operator 1 has reached ND-fixing point Nd and determining that the shift lever is at the N-range and the predetermined conditions are satisfied, controller 13 controls first actuator SA 1 to fourth actuator SA4 such that only first lock lever S1 and fourth lock lever S4 restrict movement of operator 1.

As shown in 5 of FIG. 10, when receiving a signal from sensor 5 which represents that operator 1 has reached ND-fixing point Nd and determining that the shift lever is at the D-range, controller 13 controls first actuator SA1 to fourth actuator SA4 such that only first lock lever S1 and third lock lever S3 restrict movement of operator 1.

As shown in 6 of FIG. 10, when receiving a signal from sensor 5 which represents that operator 1 has reached D-temporary point D, controller 13 controls first actuator SA1 to fourth actuator SA4 such that only first lock lever S1 restricts movement of operator 1.

As shown in FIG. 11, when receiving a signal from sensor 5 which represents that operator 1 has reached M-fixing point M, controller 13 controls first actuator SA1 to fourth actuator SA4 such that only first lock lever S1 and third lock lever S3 restrict movement of operator 1.

The predetermined conditions described above of which satisfaction is determined by controller 13 are the vehicle velocity, the state of the brake pedal, and the operational state of safety switch 9, and controller 13 determines that the conditions are satisfied, when the vehicle velocity is 4 to 7 km/h, the brake pedal has been pressed down, and safety switch 9 is in operation.

In the embodiment of the present invention having the above configuration, as shown in FIGS. 12 to 14, the shift lock state is changed by shifting, which is described hereafter.

The state No. 1 illustrates that the driver shift to the R-range from the P-range when operator 1 is at NR-fixing point Nr, in which it is initially in the shift lock state where all of first lock lever S1 to fourth lock lever S4 restrict movement of operator 1 as in 2 of FIG. 9. Thereafter, when the vehicle velocity is 6 km/h or less, the driver has pressed down the brake pedal, and the predetermined conditions are satisfied by operating safety switch 9, controller 13 controls the actuators such that only third lock lever S3 and fourth lock lever S4 are in the shift lock state as in 3 of FIG. 9.

That is, the driver should presses down the brake pedal and pushes safety switch 9, with the vehicle almost stopped, in order to shift to the R-range.

Thereafter, as the driver pushes operator 1 to R-temporary point R, controller 13 allows operator 1 to be sequentially moved to NR-fixing point Nr and ND-fixing point Nd by locating third lock lever S3 and fourth lock lever S4 in the shift lock state as in 1 of FIG. 9, such that this makes a similar circumstance to when R-range is selected in FIG. 5.

As the operator 1 is released in the above state, operator 1 automatically returns to NR-fixing point Nr, a controller 13 where the movement along the path is inputted from sensor 5 determines that this operation is shifting to the R-range and updates the shifting state as the R-range state when operator 1 returned to NR-fixing position Nr.

Controller 13 locates only first lock lever S1 and fourth lock lever S4 into the shift lock state, as shown in 6 of FIG. 9, and second lock lever S2 and third lock lever S3 are in the shift release state, such that operator 1 can sequentially move to ND-fixing point Nd and D-temporary point D, which is the same sate when the shift lever is positioned at the R-range shown in FIG. 5.

With operator 1 positioned at NR-fixing point Nr and the shift lever positioned at the P-range, when the predetermined conditions are satisfied, that is, the vehicle velocity is 6 km/h or less and the driver operates safety switch 9 while pressing down the brake pedal, controller 13, unlike 3 of FIG. 9, can control the actuators such that only third lock lever S3 is in the shift lock state.

This is required for vehicles of consumers who want quick entry into the manual mode. That is, when the conditions are satisfied, operator 1 is allowed to prepare for quickly moving to M-fixing point through ND-fixing point Nd by releasing in advance fourth lock lever S4.

However, some consumers do not want the immediate operation of the manual mode or enter the manual mode by mistake, such that in the present embodiment, as shown in 3 of FIG. 9, third lock lever S3 and fourth lock lever S4 are both in the shift lock state.

The state No. 2 of FIG. 12 a process that the driver shifts to the D-range, when operator 1 is positioned at NR-fixing point Nr in the P-range state. In the initial state, all of first lock lever S1 to fourth lock lever S4 is in the shift lock state where they restrict movement of operator 1 as shown in 2 of FIG. 9. Thereafter, when the vehicle velocity is 6 km/h or less, the driver has pressed down the brake pedal, and the predetermined conditions are satisfied by operating safety switch 9, controller 13 controls the actuators such that only third lock lever S3 and fourth lock lever S4 are in the shift lock state as in 3 of FIG. 9.

That is, the driver should presses down the brake pedal and pushes safety switch 9, with the vehicle almost stopped, in order to shift from the P-range to the D-range.

Thereafter, as the driver moves operator 1 to ND-fixing point Nd, controller 13, as shown in 5 of FIG. 10, locates only first lock lever S1 and third lock lever S3 into the shift lock state such that operator 1 can be moved to NR-fixing point Nr or M-fixing point M. Accordingly, a circumstance similar to the state in which the manual mode is operated or the shift lever can be directly operated from the D-range to the N-range in FIG. 5 is made.

Preventing operator 1 from being directly moved to R-temporary point R by first lock lever S1 is for preventing a dangerous operation of rapidly shifting from the D-range to the R-range through the N-range. Further, this is because the shift lever can be moved to the R-range even after it moves to the N-range by moving operator 1 to NR-fixing point, only when the conditions about the vehicle velocity, the brake pedal, and safety switch 9 are satisfied.

In the above operation, controller 132 determines that it is an operation to the D-range and updates, as the D-range state, that operator 1 moves to ND-fixing point Nd.

No. 4 of FIG. 12 shows a process that the driver shifts to the N-range, when operator 1 is positioned at NR-fixing point Nr in the R-range state. In the initial state, only first lock lever S1 and fourth lock lever S4 are in the shift lock state where they restrict movement of operator 1 as shown in 6 of FIG. 9, and as the driver moves operator 1 to ND-fixing point Nd, controller 13 determines this operation as N-range shifting and sets the N-range shifting state, and locates only first lock lever S1, second lock lever S2, and fourth lock lever S4 into the shift lock state, as shown in 3 of FIG. 10.

That is, when only third lock lever S3 is in the shift release state, operator 1 can be directly moved to D-temporary point D and this operation is D-range shifting, which implements the state in which it is possible to directly select the D-range from the N-range of FIG. 5 and operator 1 should be allowed to move from the N-range to the R-range only when the conditions are satisfied. Therefore, first lock lever S1 and second lock lever S2 are in the shift lock state and the operation to the manual mode should be prevented, such that fourth lock lever S4 is in the shift lock state.

No. 5 of FIG. 12 shows a process that the driver shifts to the D-range, when operator 1 is positioned at NR-fixing point Nr in the R-range state. In the initial state, only first lock lever S1 and fourth lock lever S4 are in the shift lock state where they restrict movement of operator 1 as shown in 6 of FIG. 9, and as the driver moves operator 1 to ND-fixing point Nd, controller 13 determines this operation as N-range shifting and sets the N-range shifting state, and locates only first lock lever S1, second lock lever S2, and fourth lock lever S4 into the shift lock state, as shown in 3 of FIG. 10.

Thereafter, as the driver continues to push operator 1 to the D-temporary point D, controller 13 locates only first lock lever S1 into the shift lock state as in 6 of FIG. 10, and then as operator 1 returns to ND-fixing point Nd, only first lock lever S1 and third lock lever S3 are in the shift lock state as in 5 of FIG. 10, such that it is possible to shift to the N-range by moving operator 1 to NR-fixing point Nr or operate the manual mode by moving operator 1 to M-fixing point M and then to the (+)-temporary point (+) or the (−)-temporary point (−).

The state shown in 6 of FIG. 12 shows a process that the driver shifts to the P-range, when operator 1 is positioned at NR-fixing point Nr in the R-range state. In the initial state, only first lock lever S1 and fourth lock lever S4 are in the shift lock state where they restrict movement of operator 1 as shown in 6 of FIG. 9, and as the driver operate P-switch 7, controller 13 locates all of first lock lever S1 to fourth lock lever S4 into the shift lock state as in 2 of FIG. 9 to prevent operator 1 from moving, and determines as the P-range state that operator 1 is positioned a NR-fixing point Nr.

The state shown in 7 of FIG. 12 shows a process that the driver shifts to the R-range, when operator 1 is positioned at NR-fixing point Nr in the N-range state. In the initial state, only first lock lever S1 and third lever S3 are in the shift lock state as in 4 of FIG. 9, and then when the driver presses the brake pedal and operates safety switch 9 to satisfy the predetermined conditions at the vehicle velocity of 6 km/h or less, controller 13 controls the actuators such that only third lock lever S3 is in the shift lock state as in 5 of FIG. 9.

That is, the driver should presses down the brake pedal and pushes safety switch 9, with the vehicle almost stopped, in order to shift from the N-range to the R-range.

Since only third lock lever S3 is in the shift lock state, operator 1 can move from ND-fixing point Nd to R-temporary point R, which makes the same state as the state in which it is possible to shift to the D-range and the R-range in FIG. 5.

Thereafter, as the driver moves operator 1 to R-temporary point R, controller 13 locates only third lock lever S3 and fourth lock lever S4 into the shift lock state as in 1 of FIG. 9 such that operator 1 can move to NR-fixing point Nr to ND-fixing point Nd. Therefore, as operator 1 returns to NR-fixing point Nr in the R-range state, it can be directly released to the N-range state by further moving to ND-fixing point Nd. Accordingly, it is possible to make the similar state to the state in which it is possible to directly move the shift lever from the R-range to the N-range, as show in FIG. 5.

The state shown in 8 of FIG. 12 shows a process that the driver shifts to the D-range, when the R-range state in which operator 1 is positioned at NR-fixing point Nr in the N-range state. In the initial state, only first lock lever S1 and third lever S3 are in the shift lock state as in 4 of FIG. 9, and then when the driver moves operator 1 to ND-fixing point Nd, controller 13 determines that this is the D-range shifting and that this state is the D-range state, such that it locates only first lock lever S1 and third lock lever S3 into the shift lock state, as in 5 of FIG. 10.

The state shown in 9 of FIG. 12 shows a process that the driver shift to the P-range, when operator 1 is positioned at NR-fixing point Nr in the N-range state, in which as the driver operates P-switch 7, controller 13 locates all of first lock lever S1 to fourth lock lever S4 into the shift lock state as in 2 of FIG. 9 such that operator 1 cannot move, and determines as the P-range state that operator 1 is positioned at NR-fixing point Nr.

The state No. 10 of FIG. 13 shows a process that the driver shifts to the R-range, when operator 1 is positioned at ND-fixing point Nd in the P-range. In the initial state, all of first lock lever S1 to fourth lock lever S4 is in the shift lock state where they restrict movement of operator 1 as in 1 of FIG. 10. Thereafter, when the driver presses the brake pedal and operates safety switch 9 to satisfy the predetermined conditions at the vehicle velocity of 6 km/h or less, controller 13 controls the actuators such that only first lock lever S1 and fourth lock lever S4 are in the shift lock state as in 2 of FIG. 10.

That is, the driver should presses down the brake pedal and pushes safety switch 9, with the vehicle almost stopped, in order to shift to the R-range.

This state is a state in which operator 1 can move only to NR-fixing point Nr and D-temporary point.

Thereafter, as the driver moves operator 1 to NR-fixing point Nr, controller 13 allows operator 1 to be sequentially moved to ND-fixing point Nd and D-temporary point by locating only first lock lever S1 and fourth lock lever S4 in the shift lock state as in 6 of FIG. 9, such that this makes a similar circumstance to when R-range is selected in FIG. 5.

Controller 13 determines that this operation is R-range shifting and also determines as the R-range state that operator 1 has moved to NR-fixing point Nr.

The state No. 11 of FIG. 13 shows a process that the driver shifts to the D-range, when operator 1 is positioned at ND-fixing point Nd in the P-range. In the initial state, all of first lock lever S1 to fourth lock lever S4 is in the shift lock state where they restrict movement of operator 1 as in 1 of FIG. 10. Thereafter, when the driver presses the brake pedal and operates safety switch 9 to satisfy the predetermined conditions at the vehicle velocity of 6 km/h or less, controller 13 controls the actuators such that only first lock lever S1 and fourth lock lever S4 are in the shift lock state as in 2 of FIG. 10.

That is, the driver should presses down the brake pedal and pushes safety switch 9, with the vehicle almost stopped, in order to shift from the P-range to the D-range.

This state is a state in which operator 1 can move only to NR-fixing point Nr and D-temporary point.

Thereafter, as the driver moves operator 1 to D-temporary point D, controller 13 locates only first lock lever S1 into the shift lock state as in 6 of FIG. 10, such that after returning to ND-fixing point Nd into the D-range, operator 1 further moves to NR-fixing point Nr and it is possible to directly shift to the N-range.

In the above state, as the driver moves operator 1 to ND-fixing point Nd or removes the force applied to operator 1, controller 13 determines this operation as D-range shifting and also determines as the D-range state that operator 1 is positioned at ND-fixing point Nd and locates first lock lever S1 and third lock lever S3 into the shift lock state as in 5 of FIG. 10. Therefore, it is possible to shift to the N-range by moving operator 1 to NR-fixing point or operate the manual mode by moving it to M-fixing point and to the (+)-temporary point (+) or the (−)-temporary point (−).

The state No. 12 of FIG. 13 shows a process that the driver shifts to the R-range when operator 1 is at ND-fixing point Nd in the N-range. In this initial state, only first lock lever S1, second lock lever S2, and fourth lock lever S4 are in the shift lock state where they restrict movement of operator 1 as in 3 of FIG. 10. Thereafter, when the driver presses the brake pedal and operates safety switch 9 to satisfy the predetermined conditions at the vehicle velocity of 6 km/h or less, controller 13 controls the actuators such that only first lock lever S1 and fourth lock lever S4 are in the shift lock state as in 4 of FIG. 10.

That is, the driver should presses down the brake pedal and pushes safety switch 9, with the vehicle almost stopped, in order to shift from the N-range to the R-range.

In this state, operator 1 can move to NR-fixing point Nr or D-temporary point D, and as the driver moves operator 1 to NR-fixing point Nr, controller 13 determines this operation as the R-range shifting and locates only first lock lever S1 and fourth lock lever S4 into the shift lock state as in 6 of FIG. 9. Thereafter, operator 1 can freely move to ND-fixing point Nd and D-temporary point D, such that it is possible to achieve the same effect as when the shift lever is positioned at the R-range of FIG. 5.

The state No. 13 of FIG. 13 shows a process that the driver shifts to the D-range when operator 1 is at ND-fixing point Nd in the N-range. In this initial state, only first lock lever S1, second lock lever S2, and fourth lock lever S4 are in the shift lock state where they restrict movement of operator 1 as in 3 of FIG. 10. Thereafter, when the driver moves operator 1 to D-temporary point D, controller 13 locates only first lock lever S1 into the shift lock state as in 6 of FIG. 10 and allows operator 1 to return to ND-fixing point Nd.

Thereafter, as the driver moves operator 1 to ND-fixing point Nd or releases operator 1 to return to ND-fixing point Nd by itself, controller 13 determines D-range shift and also determines as the D-range state that operator 1 moves to ND-fixing point, and locates only first lock lever S1 and third lock lever S3 into the shift lock state as in 5 of FIG. 10.

The state shown in 14 of FIG. 13 shows a process that the driver shifts to the P-range, when operator 1 is positioned at ND-fixing point Nd in the N-range. In the initial state, only first lock lever S1, second lock lever S2, and fourth lock lever S4 are in the shift lock state where they restrict movement of operator 1 as in 3 of FIG. 10. Thereafter when the driver operates P-switch 7, controller 13 locates all of first lock lever S1 to fourth lock lever S4 into the shift lock state as in 1 of FIG. 10 such that operator 1 cannot move, and determines as the P-range state that operator 1 is positioned a ND-fixing point Nd.

The state shown in 15 of FIG. 13 shows a process that the driver shifts to the N-range, when operator 1 is positioned at ND-fixing point in the D-range. In the initial state, only first lock lever S1 and third lock lever S3 are in the shift lock state as in 5 of FIG. 10. Thereafter, when the driver moves operator 1 to NR-fixing point Nr, controller 13 determines this operation as the N-range shifting and locates only first lock lever S1 and third lock lever S3 into the shift lock state as in 4 of FIG. 9.

The state shown in 16 of FIG. 13 shows a process that the driver shifts to the R-range, when operator 1 is positioned at the ND-fixing point Nd in the D-range. In the initial state, only first lock lever S1 and third lock lever S3 are in the shift lock state as in 5 of FIG. 10. Thereafter, when the driver presses down the brake pedal and operates safety switch 9 to satisfy the predetermined conditions at the vehicle velocity of 6 km/h or less, controller 13 maintains only first lock lever S1 and third lock lever S3 in the shift lock state while operator is at ND-fixing point, maintains only third lock lever S3 in the shift lock state as in 5 of FIG. 9 when operator 1 moves to NR-fixing point Nr to substantially implement the ND-range with the conditions satisfied. Further, controller 13 locates only third lock lever S3 and fourth lock lever S4 into the shift lock state as in 1 of FIG. 9 when the driver pushes operator 1 to R-temporary point R, and then locates only first lock lever S1 and fourth lock lever S4 into the shift lock state as in 6 of FIG. 9, when operator 1 returns to NR-fixing point Nr.

The state shown in 17 of FIG. 13 shows a process that the driver shifts to the P-range, when operator 1 is positioned at ND-fixing point Nd in the D-range. In the initial state, only first lock lever S1 and third lock lever S3 are in the shift lock state, in which when the driver operates P-switch 7, controller 13 locates all of first lock lever S1 to fourth lock lever S4 into the shift lock state as in 1 of FIG. 10 such that operator 1 cannot move, and determines as the P-range state that operator 1 is positioned a ND-fixing point Nd.

The states shown in 19 to 21 of FIG. 14 show that the driver operates the manual mode with operator 1, in which operator 1 moves only between ND-fixing point Nd and M-fixing point M and between (+)-temporary point (+) and (−)-temporary point (−), such that only first lock lever S1 and third lock lever S3 are kept in the shift lock state.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. An electronic shifting apparatus for a vehicle, comprising:
    an operator movable along at least two or more straight paths crossing each other at at least a point;
    a shift lock assembly controlling a movement of the operator on the straight paths of the operator;
    a sensor detecting changes in position of the operator moving along the straight paths;
    a P-switch for selecting a P-range;
    a safety switch receiving an input from a driver, other than for moving the operator;
    a controller outputting a shifting signal for controlling a transmission in response to an input from the sensor, the P-switch, and the safety switch and controlling the shift lock assembly on the basis of the position of the operator,
    wherein one of the straight paths sequentially have an R-temporary point for selecting a R-range, an NR-fixing point and an ND-fixing point for selecting an N-range, and a D-temporary point for selecting a D-range,
    wherein the ND-fixing point is connected with another straight path connecting an M-fixing point for selecting a neutral state in an manual mode, and
    both sides of the M-fixing point are connected with a (+)-temporary point (+) and a (−)-temporary point (−) through another straight line to operate the manual mode.

2. The electronic shifting apparatus for a vehicle as defined in claim 1,
    wherein the operator in the R-temporary point returns to the NR-fixing point when an external force is removed from the operator,
    wherein the operator in the D-temporary point returns to the Nd-fixing point when an external force is removed from the operator, and
    wherein the (+)-temporary point (+) and the (−)-temporary point (−) return to the M-fixing point when an external force is removed from the operator.

3. The electronic shifting apparatus for a vehicle as defined in claim 1, wherein the shift lock assembly includes:
    a locking body fixed to a car body,
    a first lock lever, a second rocking lever, a third lock lever, and a fourth lock lever rotatably connected to the locking body to selectively restrict movement of the operator between the R-temporary point and the NR-fixing point, between the NR-fixing point and the ND-fixing point, between the ND-fixing point and the D-temporary point, and between the ND-fixing point and the M-fixing point, respectively, and
    a first actuator, a second actuator, a third actuator, and a fourth actuator controlled by the controller to actuate the first lock lever, the second lock lever, the third lock lever, and the fourth lock lever, respectively.

4. The electronic shifting apparatus for a vehicle as defined in claim 3, wherein:
    the first lock lever to the third lock lever has a restricting portion that restricts movement of the operator,
    the opposite portion to the restricting portion of the first lock lever to the third lock lever are pivotably connected to the lock body by a hinge,
    the first actuator to the third actuator each have an operating rod connected to the first lock lever to the third lock lever to transmit straight motion to the first lock lever to the third lock lever such the lock levers pivot on hinge, and
    the positional order of the restricting portion, the operating rod connected thereto, and the hinge in the second lock lever is different from the positional order of the restricting portions, the operating rod connected thereto, and the hinge in the first lock lever and the third lock lever.

5. The electronic shifting apparatus for a vehicle as defined in claim 4, wherein:
    the hinge is positioned between the restricting portion and the operating rod connected thereto in the first lock lever,
    the operating rod is positioned between the restricting portion and the hinge in the second lock lever, and
    the hinge is positioned between the restricting portion and the operating rod connected thereto in the third lock lever.

6. The electronic shifting apparatus for a vehicle as defined in claim 5, wherein:
    the first actuator to the fourth actuator is a solenoid actuator, respectively,
    the first actuator to the third actuator move straight the operating rod when being supplied with control current, and elastically return the operating rod when the control current is stopped,
    the first lock lever and the third lock lever are disposed such that the restricting portions restrict movement of the operator, when the control current is stopped to the first actuator and the third actuator, and
    the second lock lever is disposed such that the restricting portion restricts movement of the operator, when control current is supplied to the second actuator.

7. The electronic shifting apparatus for a vehicle as defined in claim 6, wherein the controller controls the first actuator to the fourth actuator while making only the third lock lever and the fourth lock lever restrict movement of the operator, in response to a signal from the sensor which represents that the operator have reached the R-temporary point.

8. The electronic shifting apparatus for a vehicle as defined in claim 7, wherein, when receiving a signal from the sensor which represents that the operator has reached the NR-fixing point and determining that a shift lever is at the P-range and predetermined conditions are not satisfied, the controller controls the first actuator to the fourth actuator such that all of the first lock lever to the fourth lock lever restricts movement of the operator.

9. The electronic shifting apparatus for a vehicle as defined in claim 8, wherein when receiving a signal from the sensor which represents that the operator has reached the NR-fixing point and determining that the shift lever is at the P-range and the predetermined conditions are satisfied, the controller controls the first actuator to the fourth actuator such that only the third lock lever and the fourth lock lever restrict movement of the operator.

10. The electronic shifting apparatus for a vehicle as defined in claim 9, wherein when receiving a signal from the sensor which represents that the operator has reached the NR-fixing point and determining that the shift lever is at the N-range and the predetermined conditions are not satisfied, the controller controls the first actuator to the fourth actuator such that only the first lock lever and the third lock lever restrict movement of the operator.

11. The electronic shifting apparatus for a vehicle as defined in claim 10, wherein when receiving a signal from the sensor which represents that the operator has reached the NR-fixing point and determining that the shift lever is at the N-range and the predetermined conditions are satisfied, the controller controls first actuator to the fourth actuator such that only the third lock lever restricts movement of the operator.

12. The electronic shifting apparatus for a vehicle as defined in claim 11, wherein when receiving a signal from the sensor which represents that the operator has reached the NR-fixing point and determining that the shift lever is at the R-range, the controller controls the first actuator to the fourth actuator such that only the first lock lever and the fourth lock lever restrict movement of the operator.

13. The electronic shifting apparatus for a vehicle as defined in claim 12, wherein when receiving a signal from the sensor which represents that the operator has reached the ND-fixing point Nd and determining that the shift lever is at the P-range and the predetermined conditions are not satisfied, the controller controls the first actuator to the fourth actuator such that all of the first lock lever to the fourth lock lever restricts movement of the operator.

14. The electronic shifting apparatus for a vehicle as defined in claim 13, wherein when receiving a signal from the sensor which represent that the operator has reached the ND-fixing point and determining that the shift lever is at the P-range and the predetermined conditions are satisfied, the controller controls the first actuator to the fourth actuator such that only the first lock lever and the fourth lock lever restrict movement of the operator.

15. The electronic shifting apparatus for a vehicle as defined in claim 14, wherein when receiving a signal from the sensor which represent that the operator has reached the ND-fixing point Nd and determining that the shift lever is at the N-range and the predetermined conditions are not satisfied, the controller controls the first actuator to the fourth actuator such that only the first lock lever, the second lock lever, and the fourth lock lever restrict movement of the operator.

16. The electronic shifting apparatus for a vehicle as defined in claim 15, wherein when receiving a signal from the sensor which represent that the operator has reached the ND-fixing point and determining that the shift lever is at the N-range and the predetermined conditions are satisfied, the controller controls the first actuator to the fourth actuator such that only the first lock lever and the fourth lock lever restrict movement of the operator.

17. The electronic shifting apparatus for a vehicle as defined in claim 16, wherein when receiving a signal from the sensor which represents that the operator has reached the ND-fixing point and determining that the shift lever is at the D-range, the controller controls the first actuator to the fourth actuator such that only the first lock lever and the third lock lever restrict movement of the operator.

18. The electronic shifting apparatus for a vehicle as defined in claim 17, wherein when receiving a signal from the sensor which represents that the operator has reached the D-temporary point, the controller controls the first actuator to the fourth actuator such that only the first lock lever restricts movement of the operator.

19. The electronic shifting apparatus for a vehicle as defined in claim 17, wherein when receiving a signal from the sensor which represents that the operator has reached the M-fixing point, the controller controls the first actuator to the fourth actuator such that only the first lock lever and the third lock lever restrict movement of the operator.

20. The electronic shifting apparatus for a vehicle as defined in claim 8, wherein when receiving a signal from the sensor which represents that the operator has reached the NR-fixing point and determining that the shift lever is at the P-range and the predetermined conditions are satisfied, the controller controls first actuator to the fourth actuator such that only the third lock lever restricts movement of the operator.

21. The electronic shifting apparatus for a vehicle as defined in claim 8, wherein the predetermined conditions determined by the controller are a vehicle velocity, a state of a brake pedal, and an operational state of the safety switch.

22. The electronic shifting apparatus for a vehicle as defined in claim 21, wherein it is determined that the predetermined conditions are satisfied, when the vehicle velocity is between approximately 4 to approximately 7 km/h, the brake pedal has been pressed down, and the safety switch is in operation.

* * * * *